M. HOUDAILLE.
SHOCK ABSORBER.
APPLICATION FILED JAN. 17, 1912.

1,087,017.

Patented Feb. 10, 1914.

2 SHEETS—SHEET 1.

Attest
C E Parsons
H. M. Barrett

Inventor
Maurice Houdaille
By Spear, Middleton,
Donaldson & Spear
Attys

UNITED STATES PATENT OFFICE.

MAURICE HOUDAILLE, OF PARIS, FRANCE, ASSIGNOR TO LA SOCIETE HOUDAILLE ET SABOT, OF PARIS, FRANCE.

SHOCK-ABSORBER.

1,087,017.  Specification of Letters Patent.  Patented Feb. 10, 1914.

Application filed January 17, 1912.  Serial No. 671,727.

*To all whom it may concern:*

Be it known that I, MAURICE HOUDAILLE, a citizen of the French Republic, residing at Paris, France, have invented certain new and useful Improvements in Shock-Absorbers, of which the following is a specification.

This invention relates to a shock absorber, and includes devices (1) for the automatic filling of any empty spaces or vacuum that may be produced for any reason in any apparatus in which liquids circulate, more particularly in shock absorbers for vehicles, either by means of a recuperator of losses or by means of a compensator fed entirely or partly by leakages of the liquid of the apparatus; (2) for adjusting the initial resistance of the shock absorbing apparatus to a given load, and regulating the variation of the said resistance in accordance with the movement of the movable body the shocks of which are to be absorbed.

Figure 1:
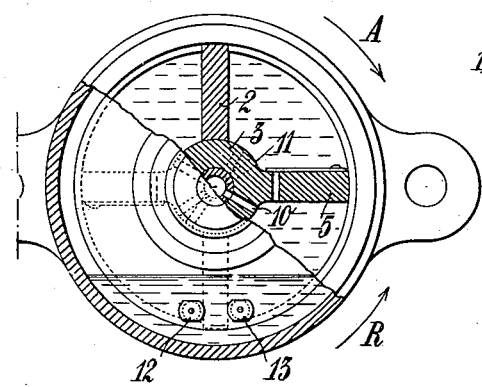
Figure 2:
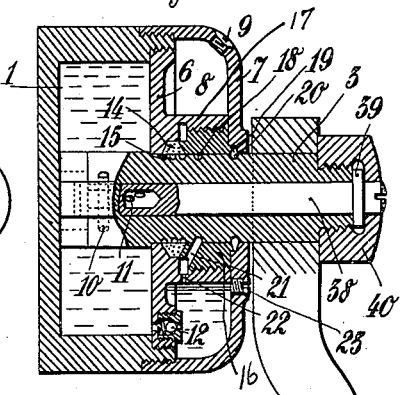
Figure 4:
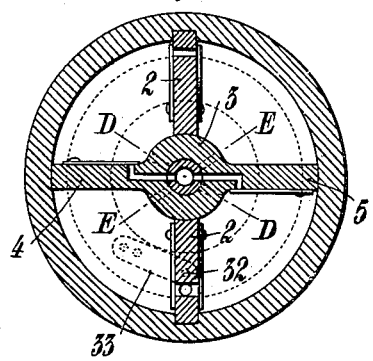
Figure 3:
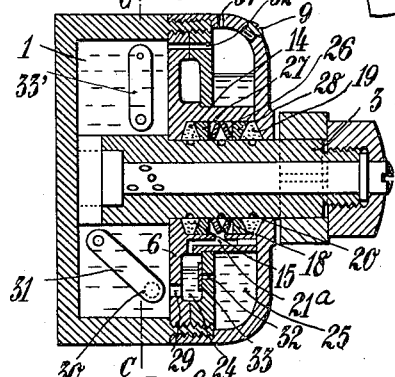
Figure 5:
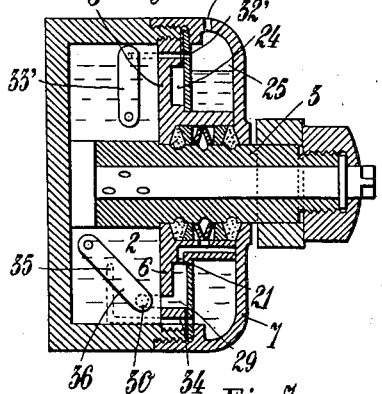
Figure 6:
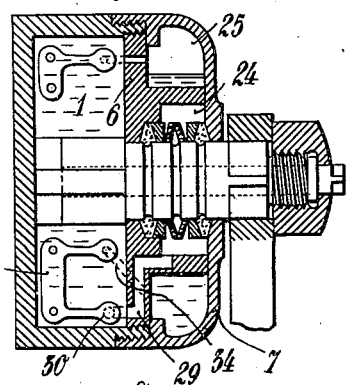
Figure 7:
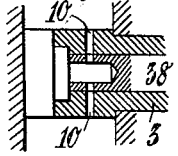
Figure 8:
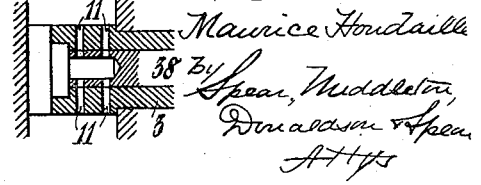
Figure 9:
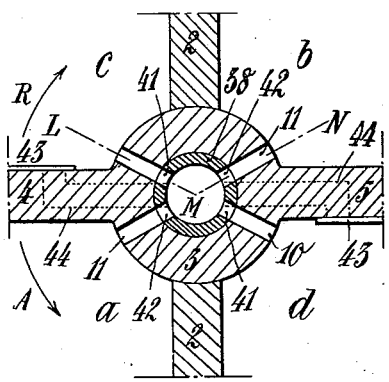
Figure 10:
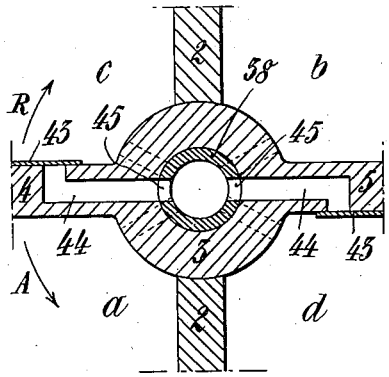
Figure 11:
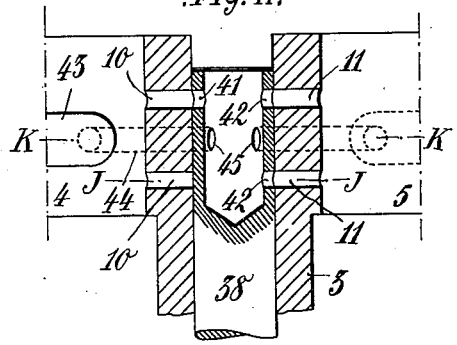
Figure 13:
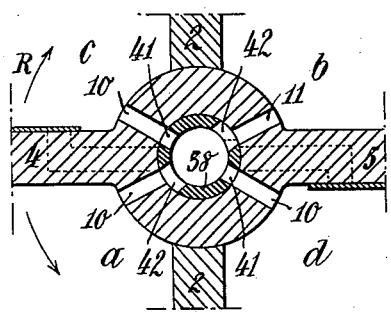
Figure 14:
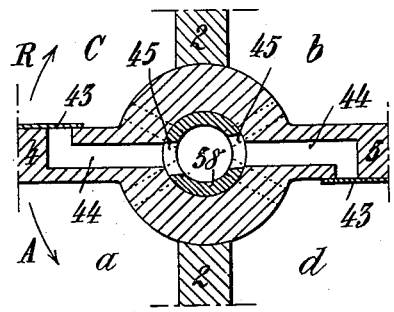

This invention is illustrated in the accompanying drawings in which—Figure 1 is a vertical section at a right angle to the axis of the apparatus, in which the functions of compensating and replacing the leakages, are obtained by means of one auxiliary chamber. Fig. 2 is a section parallel to the axis of the said apparatus. Fig. 3 is a view similar to that of Fig. 2, of another construction according to this invention in which the functions of compensating and recuperating the leakages are effected by means of separate chambers. Fig. 4 is a section on line C—C of Fig. 3. Figs. 5 and 6 are views similar to that of Fig. 3, of modified constructions with separate chambers. Figs. 7 and 8 are sections made respectively on lines D—D and E—E of Fig. 4. Figs. 9—14 are diagrammatic views of the central portion of the shock absorbing device, showing more particularly the arrangements that can be used on the apparatus, for the purpose of varying the regulation in accordance with the method of braking adopted, Figs. 9 and 10 being respectively sections on lines J—J and K—K of Fig. 11 which is a section on broken line L—M—N of Fig. 9, and Figs. 13 and 14 are sections, similar to those of Figs. 9 and 10, of another arrangement.

In the construction shown in Figs. 1 and 2, the apparatus comprises a cylindrical casing 1 divided into two compartments by a fixed partition 2. In the center of the said casing is arranged a hollow spindle 3 provided with two blades, 4, 5, which act as rotary pistons and separate each of the compartments of the cylinder 1 into two chambers. The said cylinder is closed by a disk 6 covered in its turn by a hollow cover 7, in the interior of which a chamber 8 is formed. A hole closed by a screw plug 9, enables the apparatus to be filled with glycerin or other suitable liquid.

Several of the apparatus being applied to a motor car, the cylinder of each of them is secured by bolts to the frame of the vehicle, while the spindle 3 is connected by means of a connecting rod to the straps of each spring. Each apparatus being thus arranged, the two blades 4 and 5 can move in the interior of the cylinder under the action of various movements of the spring, on condition that the liquid can pass freely from one chamber into the other. This regulation takes place through conduits 10, 11, provided in the spindle of the rotary piston, the cross-section of which conduits can be adjusted as will be hereinafter explained. The chamber 8 communicates with each of the compartments of the cylinder 1 by means of valves 12, 13, which are automatically opened in order to allow liquid to pass into the compartment and closed to prevent any liquid from returning into the chamber 8.

The spindle 3 passes through the disk 6 and the cover 7 by means of a stuffing box consisting of leather washers 14 penetrating into grooves 15 of the said spindle and tightened or compressed by means of a ring 16 screwed into the hub 17 of the disk 6. Another packing washer 19 made of leather or other suitable material, is compressed between the end of the hub 17 and the inner face of the cover 7, and penetrates into a groove 20 of the spindle 3. Another groove 18 with a sharp edge is provided on the spindle 3 between the grooves 15 and 20, and communicates by means of conduits 21 22 in the ring 16 and in the hub 17, with the tank 8. When thus constructed, the apparatus renders it possible to obtain automatic recuperation and compensation of leakage that may take place during working. This double function is obtained as follows: During the alternate movement transmitted to the blades 4, 5 owing to the movements of the spring, the liquid is submitted to a certain pressure which has the tendency to force it through the stuffing box 14. The few drops of liquid due to the leakage thus produced, after having passed the washer 14, meet the groove 18 with a sharp edge whence, being no longer exposed to the pressure, the said drops fall through the conduits 21 22 into a tank 8 which they feed.

During the movement of the blades 4 5, there takes place alternately, at each side of the partition, a period of depression and of suction, which has the tendency to open the valves 12 13, and consequently to draw into the tank 8 a quantity of liquid corresponding to that escaping through the stuffing box. In this construction, the maximum quantity of liquid that must be contained in the tank 8, does not reach the level of the bottom portion of the hub 17, in order that the discharge of the said liquid can take place freely. A plug 23 arranged on the cover 7, enables the level in question to be fixed exactly. The liquid could fill the tank 8, but in that case there would be the drawback of a possible leak through the outer stuffing box 20 bathing in the liquid.

In the construction shown in Figs. 3 and 4, the apparatus comprises three adjoining chambers: The first one, constituted by the cylindrical casing 1, forms the working chamber for the brake parts of the shock absorber; the second one, 24 formed in the thickness of the disk 6, is used for recovering leakages, and the third one, 25, made in the cover 7, is used for making up or compensating for any empty space or vacuum that may exist in the first chamber 1. These three chambers are of annular shape, and arranged concentrically with the spindle 3 carrying the braking blades.

The other arrangements of the apparatus are the same as in the construction shown in Figs. 1 and 2, with the peculiarity however that the inner stuffing box is constituted by two supple packing washers 14, 19 pressed in opposite directions by suitable springs 26 (Belleville washers or others), against the disk 6, the cover 7 and the spindle 3. Indeformable conical rings 27, 28 are inserted between the supple washers 14, 19, and the springs 26, in order to regulate the pressure of the latter, whatever be their deformation. One or more drip grooves 18 are made in the spindle 3 opposite the recess containing the springs 26, in order to prevent circulation along the spindle of the liquid arising from leakages.

The space in which the springs 26 are arranged communicates, by means of a conduit 21$^a$, with the recuperating chamber 24 which, in its turn, communicates with the working chamber 1 by means of a conduit 29 made in the bottom of partition 6, and a hole 30 made in the casing. Valves 31 constituted for instance by flexible blades, rest at each side of the partition 2 against the orifices of the hole 30. On the other hand, the recuperating chamber 24 communicates with the compensating chamber 25 through a hole 32 made in the partition separating the two chambers 24 and 25, and closed, at the side of the recuperating chamber, by a flexible blade 33. Being thus combined with each other and with the working chambers 1, the chambers 24 and 25 make it possible to obtain automatic recuperation and compensation as in the construction previously described.

If the quantity of liquid leaking through, which passes into the recuperating chamber 24, is equal to that escaping from the working chamber, the valve 33 offering sufficient resistance, remains in contact with its seat, in order to prevent any introduction into the recuperator of the reserve liquid contained in the compensator. The result is that all the liquid collected by the recuperator, passes first into the working chamber 1, before any admission of liquid from the compensator takes place. If, on the contrary, the quantity of liquid passing into the recuperator is for any reason smaller than that escaping from the working chamber 1, there will be produced in the said recuperator a comparative vacuum which will bring about the opening of the valve 33, so that a certain quantity of liquid from the compensator will be drawn in and pass into the working chamber 1 through the recuperator.

In the modified construction shown in Fig. 5, the compensating chamber 25 communicates directly with the working chamber 1 through a conduit 34 made in the disk 6, as well as in the thickness of the partition 2, and terminates at a hole 35 passing through the said partition. Each of the orifices of the said hole 35 is covered by a flexible blade 36 which is also used as a valve for the conduit 29 establishing communication between the recuperator 24 and the said working chamber.

The working of the device shown in Fig. 5, differs somewhat from that of the device shown in Fig. 3, in that during the suction period and, consequently, the opening of one of the valves 36, the latter simultaneously uncovers the orifices of passage of the liquid coming from the recuperator and from the compensator. During that period of opening of the valve 36, the supply of drawn in liquid coming from the compensator is however considerably smaller than that coming from the recuperator 24, for three reasons: 1. The orifices 30, being farther away from the spindle 3 than the orifices 35, a stronger suction takes place at the circumference, that is to say, through the orifices 30. 2. The cross-section of the orifices 30 is greater than that of the orifices 35. 3. The resistance to the flow of the liquid through the orifices 35 is greater than that through the orifices 30, owing to the tension of the blades 36 being smaller for the orifices 30, than for 35.

During the return of the liquid into the working compartments 1, the air bubbles that may be contained in the latter, escape through a capillary tube 32' terminating at each side of the upper portion of the partition 2, in orifices provided with valves 33', establishing communication between the chamber 1 and the compensating tank 25 which itself is in communication with the atmosphere through a small hole 37. In case of a difference between the quantity of liquid escaping from the compartments 1, and that passing into the recuperator, a quantity of liquid corresponding to that difference, is taken from the compensating tank 25 during the suction period of the blades as hereinbefore explained.

The modified construction shown in Fig. 6, gives the same conditions of automatic recuperation and compensation. In the said modified construction, the recuperating tank is disposed concentrically around the stuffing box, in the chamber of the latter, and communicates with the working compartment 1 through a conduit 29 terminating, near the circumference of the said compartment, in orifices 30 arranged at each side of the bottom partition 2 and provided with valves 36. The compensating tank 25 is concentric with the recuperating tank 24 and communicates with the working compartment 1 through a conduit 34 provided in the thickness of the partition 2 and terminating, near the spindle 3, in orifices 35 also arranged at each side of the bottom partition 2 and closed by valves 36.

The working of the construction shown in Fig. 6 is similar to that of the construction of Fig. 5. The special arrangement of the cover 7 jointed directly to the casing and around the disk 6, makes it possible to avoid the drawback of leakages of liquid escaping from the apparatus through the joint of the said cover 7.

*Automatic and adjustable advance.*—In all the constructions shown by way of example, the spindle 3 of the blades is provided longitudinally with a cylindrical hole to receive a rod 38 provided with a collar 39 resting against the end of the spindle 3. This rod 38 is held in place by a nut 40 used to secure the crank handle on the square portion of the spindle 3, and terminates in a split or polygonal head or in a head of any other shape, passing through the said nut. The said head can be operated from the outside in order to turn the rod 38 in the spindle 3. The portion of the spindle 3 situated in the working chamber 1, is provided, as already described, with transverse conduits 10 and 11 passing also through the perforated end of the rod 38. These conduits 10 and 11 intersect each other at different points of the length of the spindle 3 and are arranged so that the conduits 10 establishing communication between the compartments $c$ and $d$ of the apparatus, which correspond to the expansion or rebound of the springs (arrow R, Fig. 9), should be less numerous or of smaller cross-section than the conduits 11 establishing communication between the other two compartments $a$ and $b$ corresponding to the compression or to the yielding of the springs (arrow A). Moreover, the spindle 3 and the blades 4, 5 are provided with conduits 44 closed by valves 43 and terminating in the compartments $c$ and $d$. These various conduits 10, 11 and 44 are controlled by a kind of cock plug, constituted by the perforated end of the rod 38, which, according to the previous position of adjustment given to it in the spindle 3 regulates the cross-section of the passage of the said conduits. On the other hand, this plug renders it possible to obtain, according to the arrangement of its ports or openings, either a smaller braking at the settling or yielding (A) than at the rebound (R) or braking of the same extent in both directions, or practically no braking in the direction of yielding.

In the various constructions illustrated, the compartments $c$ $d$ communicate both with each other and with the compartments $a$ $b$ by a single conduit 10, while the compartments $a$ and $b$ communicate with each other by means of two conduits 11 of the same cross-section as those 10. This arrangement enables a greater braking to be obtained during the rebound, than during the yielding, as will be hereinafter explained. The same conditions of stronger braking in one direction than in the other, can also be obtained by the construction shown in Figs. 9–11, in which the conduits 10 and 11 are distributed in equal numbers at each side of the blades. In the said construction, Figs. 9–11, the perforated rod 38 is provided at one side only with one series of holes 41 arranged opposite one of the series of holes 10 of the spindle 3, and on the other side, with two series of holes 42 corresponding to those 11 of the said spindle. It comprises moreover a third series of holes 45 coöperating with those 44 of the valves 43. The working of these various arrangements as regards the previous and progressive regulation is as follows:—

Assuming that the apparatus is used for braking the elastic suspension of a vehicle frame, the handle connecting the spindle 3 of each apparatus to the corresponding spring must be keyed, relatively to the blades 4, 5 so that the valves 43 open in the direction of yielding of the said spring, and have the tendency to close in the direction of the rebound. The regulation of the cross-section of the passage of the conduits 10, 11 and 44, is previously effected for a given initial load, by accordingly turning the rod 38. During the period of yielding, the blades 4, 5 compress in the compartments $a$ and $b$ the liquid which passes both through the conduits 44 and the valves 43, as well as through the conduits 10, so that the resistance to the escape of the liquid is the smaller as there is produced a kind of depression in the sub-divisions $c$, $d$, opposite $a$, $b$, in which the said compression takes place. On the contrary, when the blades 4 5 compress the liquid during the period of rebounding, the said liquid, being unable to pass through the valves 43 (which are then held closed by pressure), passes entirely through the conduit 10. As the cross-section of the said conduit 10 on which the pressure is acting, is smaller than the sum of the cross-sections of the conduits 11 exposed to depression, a very great resistance to the discharge of the liquid is produced, which resistance is greater than that which the liquid had to overcome in passing through the said conduits 43 and 11 during the period of yielding. The special arrangement of the conduits 10 and 11 with different cross-sections of passage, results therefore in a braking action with progressive variation which is previously adjusted, in proportion to the initial load, the oscillations of which are to be damped by means of the rod 38 playing the part of a regulating cock. This arrangement of the holes 10, 11, in combination with the means for regulating their cross-section, therefore enables the same apparatus to be applied to vehicles with different loads, while keeping the same proportion in the braking during the yielding and during the rebound.

Figure 12:
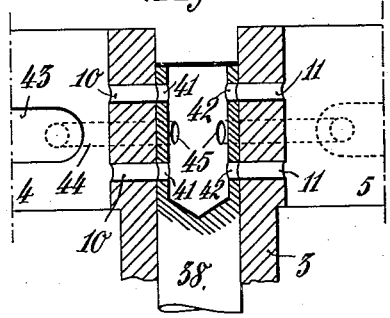

In the modified construction shown in Fig. 12, the holes 41, 42 and 45 of the regulating rod 38 are arranged in combination with the holes 10, 11 and 44 of the spindle so as to produce the same braking during the yielding and during the rebound. To that end, the rod 38 is provided with as many holes 41, 42, as there are holes 10, 11 and 44 which are distributed in equal numbers at each side of the spindle 3. Moreover the holes 41, 42 and 45 of the rod 38, are all equal. According to this construction, when the rod 38 is turned, the same adjustment of the cross-section of passage of all the conduits 10, 11 and 44, will be effected, so that the liquid will meet with the same resistance in passing from one compartment to another during the period of yielding as during the period of rebound.

In the other modified construction shown in Figs. 13 and 14, the holes of the rod are made so that the braking is equal to zero during the yielding.

It must be pointed out that in this case it is not absolutely essential that there should be no resistance at the yielding, it is sufficient that there should not be sufficient resistance, in order that there should not be any braking. This result is obtained by giving to the holes 42 of the rod 38 a cross-section twice that of the holes 11 of the spindle 3. The holes 45 corresponding to the holes 44, have the same cross-section as that of the holes 42, in Fig. 14. According to this construction, when the rod 38 is turned, the hole 10 of the compartments $c$ and $d$ corresponding to the rebound, is more or less closed, but the conduits 11 corresponding to the yielding always remain open to an extent at least double the original extent of the conduit 10. The liquid being unable to pass through the conduits 10, escapes freely through the conduits 44 with valves 43 only during the period of yielding.

The special combination of regulating rods, being interchangeable, it is possible to obtain instantaneously the three above mentioned different conditions of progressive braking on a shock absorber of a suitable system. It is sufficient for the purpose to arrange a set of three rods with holes of cross-sectional areas of passage corresponding to each of these conditions, in order to enable all the three to be obtained with the same apparatus.

Instead of making the three rods 38 interchangeable, only one of them could be provided, comprising orifices of the desired arrangement and dimensions, so as to enable the same conditions of regulation to be obtained, by turning it for instance to one-third of a revolution for fulfilling each of the said conditions.

The constructions hereinbefore described, are given merely by way of example, and the shapes, material, dimensions, detail arrangements and applications can vary without departing from this invention.

What I claim as my invention and desire to secure by Letters Patent is:—

1. In a fluid check shock absorber, a cylinder having a radial partition, a rotary piston therein, having a shaft projecting through the wall of said cylinder, a stuffing box for said shaft having a liquid collecting chamber, an annular chamber receiving liquid from said stuffing box chamber and means for automatically effecting the return of the liquid from said annular chamber to the cylinder.

2. In a fluid check shock absorber a cylinder having a radial partition, a swinging piston having a shaft projecting from said cylinder, a stuffing box encircling said shaft having an annular leakage fluid collection channel or chamber, an annular compensating chamber for receiving such leakage fluid from the chamber of the stuffing box, passages leading from said compensating chamber to the cylinder, and check valves controlling said passages.

3. In a fluid check shock absorber, a cylinder having a radial partition, a removable wall for one end of said cylinder, having a tubular extension, a radial piston having a hollow shaft journaled within said tubular extension, a stuffing box within said tubular extension, a hollow cap secured to said cylinder and forming an annular chamber about said tubular extension, said stuffing box having a leakage chamber communicating with said annular chamber, said annular chamber having communication with the interior of the cylinder, a check valve controlling said last named communication passages from the interior of said hollow shaft to the interior of the cylinder, and a rotary valve in said hollow shaft for controlling said passages.

In testimony whereof I have signed my name to this specification in the presence of two subscribing witnesses.

MAURICE HOUDAILLE.

Witnesses:
ANDRÉ SABOT,
H. C. COXE.